June 21, 1966     H. E. ASHFIELD     3,256,940

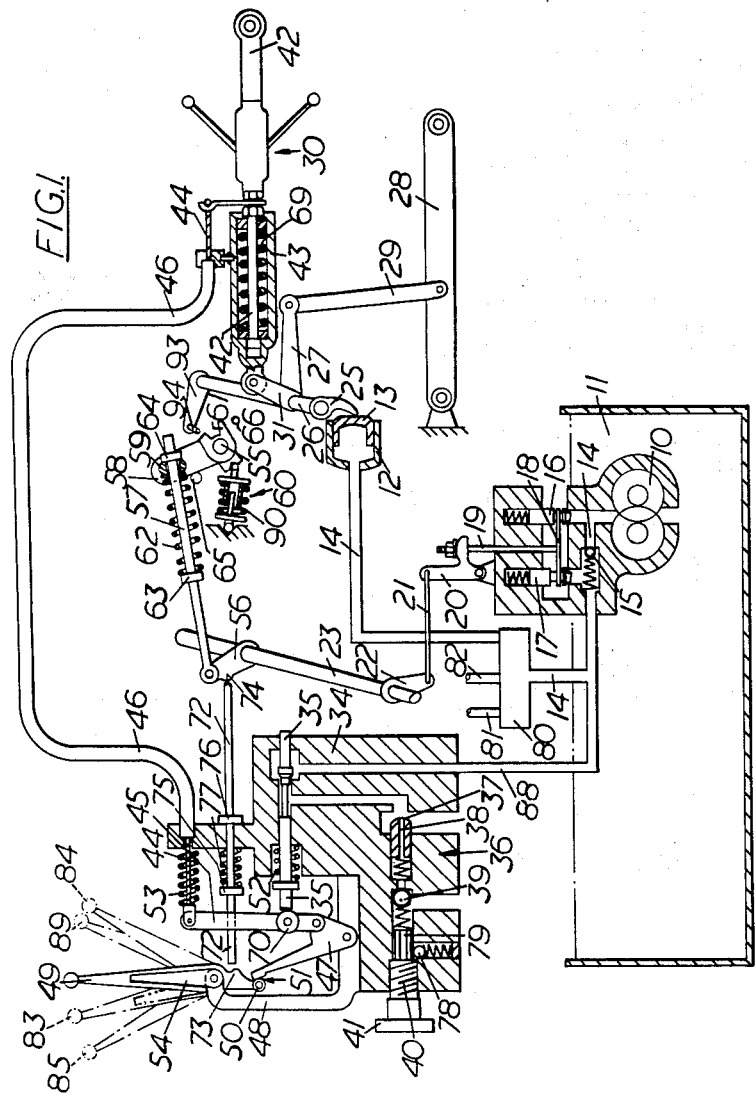

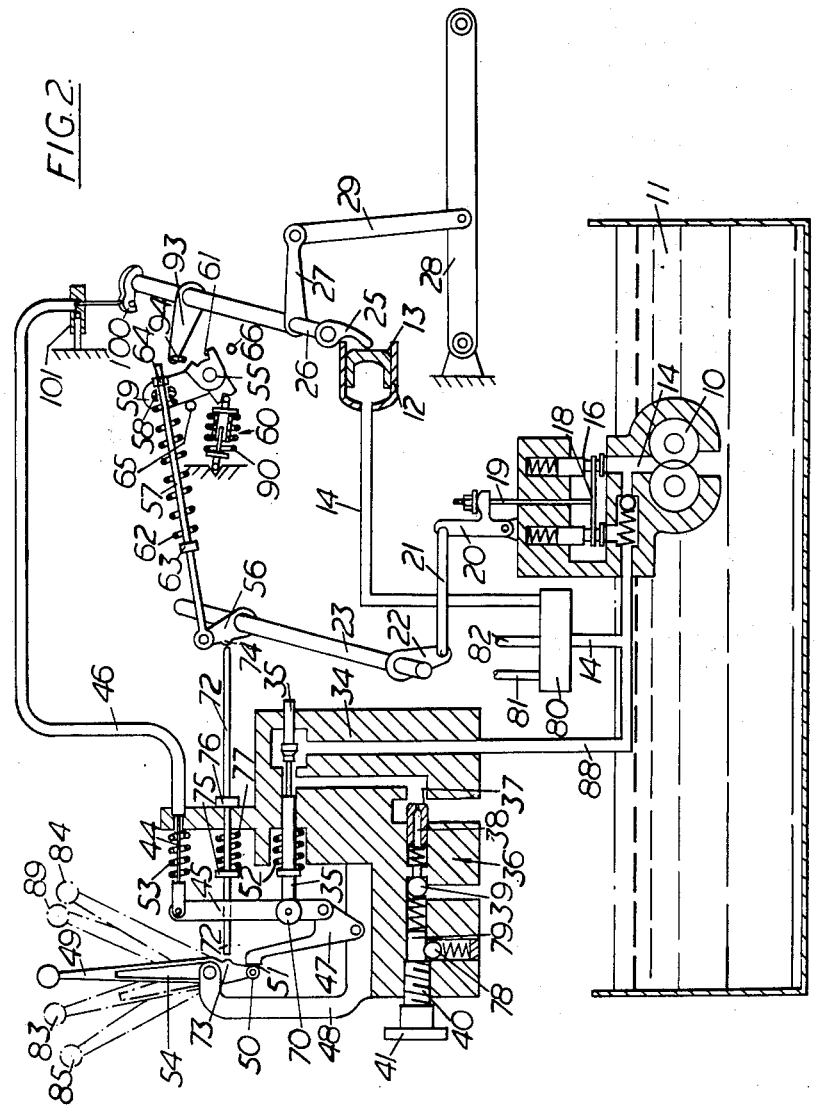

HYDRAULIC POWER LIFT MECHANISMS

Filed Sept. 3, 1963     4 Sheets-Sheet 3

*Inventor*
HERBERT EDWARD ASHFIELD

By Norris & Bateman

*Attorneys*

INVENTOR
HERBERT EDWARD ASHFIELD

United States Patent Office 3,256,940
Patented June 21, 1966

3,256,940
HYDRAULIC POWER LIFT MECHANISMS
Herbert Edward Ashfield, Meltham, Huddersfield, England, assignor to David Brown Tractors Limited
Filed Sept. 3, 1963, Ser. No. 306,193
Claims priority, application Great Britain, Sept. 6, 1962, 34,112/62
4 Claims. (Cl. 172—9)

The invention relates to hydraulic power lift mechanisms, for actuating tractor hitch linkages, of the type whereby it is possible, selectively, to vary automatically the working depth of an implement connected to a tractor hitch linkage in accordance with variations in the draft force exerted by the tractor on the implement, and to maintain the implement automatically at a positional setting relative to the tractor dependent on the position of a hand lever and independent of variations in the draft force.

Hitherto, this type of hydraulic power lift mechanism has comprised a draft control signalling member, draft control signal transmitting means, a positional control signalling member, positional control signal transmitting means, and a response member for controlling the oil pressure in a hydraulic jack for actuating the hitch linkage.

The object of the present invention is to provide a simplified mechanism of the type referred to in which separate draft control and positional control signal transmitting means are not required.

According to the invention, a tractor hydraulic power lift mechanism comprises a response member, for controlling the oil pressure in a hydraulic jack, which is operable automatically by signals transmitted through a flexible transmitting member connected selectively to a signalling member which moves when the draft force exerted by the tractor on an implement connected thereto varies or to a signalling member which moves when the position of the implement relative to the tractor varies.

A preferred embodiment of the invention will now be described, by way of example only, with reference to the accompanying drawings of which:

FIG. 1 is a semi-diagrammatic view of a tractor hydraulic power lift mechanism wherein a draft control signalling member is arranged to operate a response member;

FIG. 2 is a semi-diagrammatic view of the tractor hydraulic power lift mechanism shown in FIG. 1 wherein a positional control signalling member is arranged to operate the response member;

FIG. 3 is a semi-diagrammatic view of an alternative draft control arrangement to that shown in FIG. 1;

Figure 4:
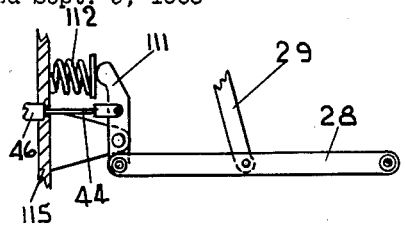
FIGURE 4 is a semi-diagrammatic view of another alternative draft control arrangement.

Referring now to the drawings, a hydraulic power lift mechanism of an agricultural tractor includes a pump 10 which draws oil from a sump 11 and communicates on its delivery side, by way of a conduit 14, with a single-acting hydraulic cylinder 12 containing a ram 13. A non-return valve 15 is disposed in the conduit 14, and two openings are provided in the said conduit, one on the pump side and one on the cylinder side of the non-return valve 15. These openings are respectively adapted to be closed by spring-loaded valve members 16 and 17 each of which is provided with an axial bleed hole (not shown) to conduct oil under pressure to the rear of the valve, and each valve is so dimensioned that the hydraulic pressure in the closing direction is equal to that in the opening direction. Each of the said valve members has a portion of reduced diameter with which engages one end of a plate 18 connected to a rod 19 which is operable through a bell crank lever 20 connected by a rod 21 to an arm 22 fixed on a shaft 23 adapted to be oscillated about its axis by means hereinafter referred to. The portion of reduced diameter is longer in the case of the valve member 17 than of the valve member 16, such that upward movement of the plate 18 will lift the valve member 16 from its seat prior to lifting the valve member 17. The connection between the rod 19 and the bell crank lever 20 is such that movement of the bell crank lever in one direction opens one or both of the valve members 16 and 17 whilst movement of the said lever in the other direction does not itself close the valve members but permits them to be closed by their associated springs. The ram 13 is adapted to act on an arm 25 fixed to a shaft 26 extending laterally across the rear of the tractor, and the shaft 26 can thus be rocked to cause two laterally spaced lift arms 27 rigidly carried by the said shaft to swing a pair of laterally spaced links 28 in an upward direction about their points of pivotal connection to the tractor by means of respective lift rods 29. For the sake of clarity, only one lift arm and its associated link and lift rod are shown in FIGS. 1 and 2. A central, upper link indicated generally at 30 is pivotally connected at its front end to a short arm 31 rigidly connected to the shaft 26. For the sake of clarity, this link is shown only in FIG. 1. Thus, an implement hitched to the rear ends of the two links 28 and of the link 30 can be raised to an inoperative position.

Connected to the conduit 14, between the non-return valve 15 and the cylinder 12, is a conduit 88 communicating with a valve housing 34 in which there is located a slide valve 35. This valve is so dimensioned that when it is open the forces exerted on it in opposite directions by the pressure in the system balance each other out in known manner, and it is adapted to be closed by a spring 52. The valve 35 is adapted to throttle the flow of oil from the conduit 88 to a valve indicated generally at 36 which is also located in the housing 34. The valve 36 comprises a spring-closed valve member 37 provided with an axial bleed hole 38 through which oil can communicate with an adjustable relief valve consisting of a spring-loaded ball 39 and a screwed adjusting member 40 having a hand wheel 41. The valve member 37 is so dimensioned that when closed the hydraulic pressure in the closing direction is slightly greater than that in the opening direction. A spring-loaded ball 78 is adapted to engage with axial grooves 79 in the member 40 so that the operator can readily adjust the valve 36 by any determined amount indicated by the number of times the ball is felt to engage in a groove. The arrangement of the valve is such that when the pressure acting on the said valve exceeds a value determined by the setting of the screwed adjusting member 40, the oil which has leaked through the bleed hole 38 lifts the spring-loaded ball 39 from its seat and unbalances the valve member 37, which thus opens to an extent sufficient to maintain a predetermined pressure drop across the valve 36.

The position of the slide valve 35 is controlled automatically by a cable of the well known kind comprising a wire 44 slidable in a flexible tubular casing 46, said cable being connectible selectively to different signalling members according to whether draft or positional control is required.

In FIG. 1, the signalling member is the central, upper link 30 previously referred to. Said link comprises two mutually telescopic parts 42 and 43 between which there is located a compression spring 69 adapted to resist both lengthening and shortening of the link 30 from an intermediate or nominal length. The part 43 is pivotally connected to the arm 31 on the shaft 26 journalled on the tractor, and the part 42 is movable axially relative to the part 43, against the action of the spring 69, by any increase or decrease in the draft force exerted on an implement (not shown) connected to the tractor by means of the two links 28 and of the part 42 of the link 30. The wire 44 is connected at one end to the part 42 of the link 30 and at the other end to one end of a lever 45 whilst the casing 46 which surrounds the wire 44 abuts at one end against the part 43 of the link 30 and at the other end against the valve housing 34.

In FIG. 2, the signalling member is the previously mentioned shaft 26 on which there is secured an arm 100. For the sake of clarity, said arm is shown only in FIG. 2. That end of the wire 44 which is shown in FIG. 1 as being connected to the part 42 of the link 30 is connected to the arm 100, and adjacent said arm there is secured to the tractor frame an abutment 101 for that end of the casing 46 which is shown in FIG. 1 as abutting against the part 43 of the link 30.

The lever 45 is provided, intermediate its ends, with a roller 70 adapted to bear against one end of the slide valve 35, and is pivotally connected at its end remote from the cable to a member 47 pivoted on the valve housing 34. Pivoted on an arm 48 extending from the valve housing 34 is a hand lever 49 carrying a roller 50 adapted to bear against a surface 51 on the member 47. The spring 52 and a light compression spring 53 on the wire 44 act to stabilise the lever 45 and the member 47. Friction means (not shown) are provided at the pivot of the hand lever 49 to hold the lever in any desired position against the action of the spring 52. A datum lever 54 is also pivoted on the arm 48 about the same axis as the lever 49, and is likewise held in any desired position by the said friction means, with a greater force than that which holds the hand lever 49.

The shaft 23 has fixed to it an arm 56 which is pivotally connected to one end of a rod 57, the other end of which is connected by lost motion means to an arm 58 pivotable about a fixed axis 55. The said lost motion means comprise a stud 59 rotatably connected to the arm 58 and having a diametrical bore in which the rod 57 is slidable. A compression spring 62 is located between the stud 59 and a flange 63 on the rod 57, and the rearward end of the rod 57 is provided with another flange 64. An over-centre device indicated generally at 60, and including a coil spring 90, is associated with the arm 58, and a cam member 61 is rigidly connected to the said arm. Stops 65 and 66 are provided to limit angular movement of the arm 58. The shaft 26 carries rigidly an arm 93 carrying a peg 94 adapted to engage with the cam member 61.

A rod 72 is slidable longitudinally in the valve housing 34 and is adapted to abut at one end against a projection 73 on the hand lever 49 and at the other end against a projection 74 on the arm 56. The said rod has two fixed flanges 75 and 76 located on opposite sides of the valve housing 34, and a compression spring 77 is located between the flange 75 and the valve housing.

Figure 6:
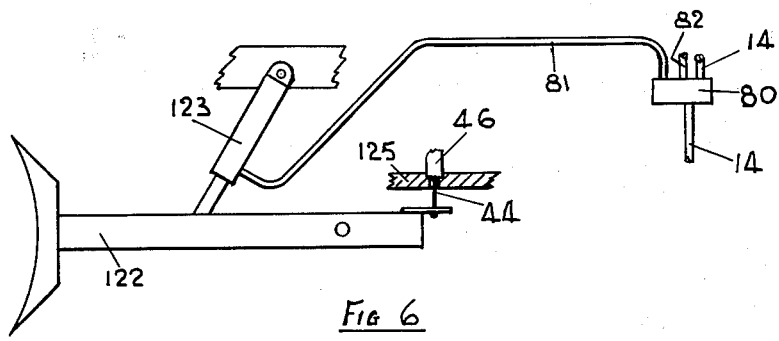
FIGURE 6 is a semi-diagrammatic view of an alternative positional control arrangement to that shown in FIGURE 2, for use with a bulldozer attachment.

A valve chest 80 is disposed in the conduit 14 and contains conventional manually-operated means (not shown) for selectively admitting oil either to the cylinder 12 or through either of the conduits 81 and 82 to an auxiliary hydraulic cylinder (see FIGURE 6).

Relief valve means (not shown) are provided in known manner to limit the maximum pressure in the system to a safe permissible value.

The manner of operation as a draft control system is as follows:

The cable 44, 46 is connected as shown in FIG. 1, and communication is established through the valve chest 80 between the pump 10 and cylinder 12. When an implement (not shown) connected to the two links 28 and the link 30, and not provided with its own depth-regulating means, is in working position, the valve members 16 and 17 are closed and the hand lever 49 is in such a position as to maintain the implement at the desired working depth by causing the slide valve 35 to throttle the flow of oil from the pump 10 to the valve 36. FIG. 1 illustrates the mechanism in these conditions, the hand lever 49 and datum lever 54 being shown in full lines in a typical position. If any variation occurs in the draft force exerted on the implement, the central, upper link 30 either lengthens or shortens with the result that the lever 45 connected to the wire 44 pivots about its point of connection to the member 47 and increases or decreases the flow of oil past the slide valve 35 by effecting axial movement of the said slide valve. A decrease in draft force will extend the central, upper link 30 and reduce the pressure drop across the slide valve 35, thereby reducing the pressure in the cylinder 12 and permitting the working depth of the implement to increase. Conversely, when an increase in draft force occurs, the mechanism operates to reduce the working depth of the implement. In no case, however, can the pressure in the system fall below a minimum value determined by the setting of the screwed adjusting member 40 of the valve 36. Thus, there is always a certain amount of weight being transferred from the implement to the tractor to reduce any tendency for the driving wheels of the tractor to spin. Variations in the working depth of the implement are effected by the driver moving the hand lever 49 to any desired position between the ghosted positions 83 and 89 in FIG. 1. At the same time he can move the datum lever 54 to the same position in order to mark said position for future reference. Such movement of the hand lever 49 causes the member 47 to pivot the lever 45, about its point of connection to the wire 44 so as to move the slide valve 35 axially, and to increase or decrease the pressure drop across the said slide valve as previously described.

Due to the compression spring 69 being adapted to resist both lengthening and shortening of the link 30 from an intermediate or nominal length, the power lift mechanism is draft responsive when the overhung weight of the implement is greater than the draft force as well as when the draft force is greater than the overhung weight.

When it is desired to raise the implement clear of the ground, the hand lever 49 is moved by the driver to the position 84 in which the roller 50 no longer makes contact with the member 47. If the implement is to be subsequently lowered to the same working depth as before, the driver does not move the datum lever 54. The slide valve 35 is, therefore, closed by the associated spring 52 and, since the valve members 16 and 17 are closed, the pressure in the conduit 14 and thus in the cylinder 12 increases to a value sufficient to lift the implement. During the last few degrees of rocking movement of the shaft 26, the peg 94 carried by the arm 93 engages with the cam member 61 and moves the device 60 over-centre. The spring 90 then acts through the arm 58, rod 57, arm 56, shaft 23, arm 22, rod 21, bell crank lever 20, rod 19 and plate 18 to throw open the valve member 16 and permit the oil delivered by the pump 10 to be discharged back into the sump 11. The oil contained in the hydraulic system will be locked there by the non-return valve 15 and valve member 17 to hold the implement in its raised position. If any leakage of oil should occur to cause the implement to fall below a certain height, however, the over-centre device 60 will operate to effect the closure of the valve member 16, whereupon the oil delivered by the pump 10 will be forced past the non-return valve 15 to the hydraulic cylinder 12. When sufficient oil has been admitted to the said cylinder to cause the implement to be returned to the fully raised position, the over-centre device will again operate to open the valve member 16 and permit the oil delivered by the pump 10 to be discharged to the sump 11 as previously described.

When it is desired to lower the implement to the same working depth as before, the hand lever 49 is returned by the driver into alignment with the datum lever whereupon the slide valve 35 is re-opened to the required extent and, as the implement descends due to the oil in the hydraulic cylinder 12 escaping past said slide valve, the over-centre device 60 operates to close the valve member 16. If, however, the implement is light in weight or the soil is hard it may be found that the implement does not penetrate the soil sufficiently quickly. To remedy this, the hand lever 49 is moved by the driver into the ghosted position 85 in FIG. 1. This causes the projection 73 on the hand lever to abut against one end of the rod 72 and move the said rod longitudinally against the action of the spring 77. The other end of the rod 72 thus abuts against the projection 74 on the arm 56 and the resulting angular movement of the shaft 23, against the action of the spring 62, acts through the arm 22, rod 21, bell crank lever 20, rod 19 and plate 18 to open both the valve members 16 and 17 so as to reduce the pressure in the hydraulic system substantially to zero. When the implement has penetrated to the required depth, the hand lever 49 is moved back into alignment with the datum lever 54. The valve members 16 and 17 are thus permitted to close and the implement is again brought under the control of the slide valve 35 and the valve 36.

It is an important feature of the invention that the sensitivity of the hydraulic mechanism to the draft force exerted on the implement can be varied by appropriate adjustment of the valve 36. For example, the mechanism may be caused to operate with a pressure drop of 350 pounds per square inch across the slide valve 35 and a pressure drop of 50 pounds per square inch across the valve member 37, so that the pressure in the hydraulic cylinder 12 is 400 pounds per square inch. To achieve the first mentioned pressure drop the slide valve 35 is nearly closed and even a small movement of the lever 45 due to a small variation in draft force will have a marked effect upon the pressure in the hydraulic cylinder 12. Alternatively, a pressure of 400 pounds per square inch in the cylinder 12 may be achieved by adjusting the pressure drop across the slide valve 35 to, say, 50 pounds per square inch and that across the valve member 37 to 350 pounds per square inch. Thus the slide valve 35 is open to a much greater extent than in the previous example, and accordingly the mechanism is far less sensitive to variations in the draft force exerted on the implement.

The manner of operation as a positional control system is as follows:

The cable 44, 46 is connected as shown in FIG. 2, and communication through the valve chest 80 between the pump 10 and cylinder 12 is maintained. When an implement (not shown) connected to the two links 28 and the link 30, and not provided with its own depth-regulating means, is in working position, the valve members 16 and 17 are closed and the hand lever 49 is in such a position as to maintain the implement at the desired working depth by causing the slide valve 35 to throttle the flow of oil from the pump 10 to the valve 36. In FIG. 2, the hand lever 49 and datum lever 54 are shown in full lines in a typical position. Variations in the position of the implement relative to the tractor are effected by the driver moving the hand lever 49 to any desired position between the ghosted positions 83 and 89 in FIG. 2. At the same time he can move the datum lever 54 to the same position in order to mark said position for future reference. Such movement of the hand lever 49 causes the member 47 to pivot the lever 45 about its point of connection with the wire 44 so as to move the slide valve 35 axially. Thus the pressure in the hydraulic cylinder 12 is varied, as a result of which the working depth of the implement changes. This entails a change in the angular position of the shaft 26 which thus acts through the wire 44 to pivot the lever 45 about its point of connection to the member 47 so as to cause the slide valve 35 to be moved in the opposite direction to that in which it was moved by the hand lever 49 until a state of equilibrium is reached as the implement attains the required working depth. If the position of the hand lever 49 remains unchanged but the working depth of the implement in the soil tends to vary due to an undulation in the surface of the ground, the effective weight of the implement changes due to a variation in the proportion of the total weight which is supported by the ground, and the pressure of oil in the cylinder 12 becomes too great or too small to maintain the implement at its said position relative to the tractor. Thus the position of the implement relative to the tractor varies, this being possible since the volume of oil in the cylinder 12 can change due to the slide valve 35 being partially open. As the position of the implement relative to the tractor varies, the accompanying variation in the angular position of the shaft 26 acts through the wire 44 to pivot the lever 45 about its point of connection to the member 47, the slide valve 35 thus being moved axially as a result of which the pressure in the cylinder 12 is varied. When said pressure has varied to a value sufficient to maintain the implement at a new positional setting relative to the tractor, the mechanism is in equilibrium. This state of equilibrium is only temporarily maintained, however, since as the implement leaves the undulation behind, the position of the implement relative to the tractor reverts automatically to its original setting. When the hand lever 49 is moved to the ghosted positions 84 and 85, the result of so doing is exactly the same as when the mechanism is operated as a draft control system.

In FIG. 3 there is shown an alternative draft control arrangement to that shown in FIG. 1. In this alternative arrangement, the signalling member is a yoke 110 connected at its opposite ends to the respective lower hitch links 28, the mounting of said links on the tractor frame having been modified. As a result of this modification each of the lower links 28 is pivotally connected to the lower end of a lever 111 which is pivoted on the tractor frame about a horizontal axis. A helical compression spring 112 is located between the upper end of each of the levers 111 and the tractor frame. Each of the levers 111 is connected to the yoke 110 by means of a cable comprising a wire 113 slidable in a flexible tubular casing 114, one end of the wire being connected to the lever 111 at a point above its point of connection to the tractor frame and the other end being connected to one end of the yoke 110 whilst the respective ends of the casing 114 abut against the tractor frame at 115 and 116. That end of the wire 44 which is shown in FIG. 1 as being connected to the part 42 of the link 30 is connected to the mid-point of the yoke 110, and an abutment 117 is provided for that end of the casing 46 which is shown in FIG. 1 as abutting against the part 43 of the link 30. Stops 118 are provided to limit movement of the respective levers 111 in a clockwise direction as viewed in FIG. 3.

The manner of operation of the alternative arrangement is as follows:

When both of the springs 112 are compressed, the signal transmitted to the response member, that is to say to the slide valve 35, by the cable 44, 46 is the mean of the signals transmitted from the respective lower links 28 to the yoke 110. When the operating conditions are such that only one of said springs is compressed, the lever associated with the other of said springs being in contact with its stop 118, the signal transmitted to the slide valve 35 by the cable 44, 46 is proportional to the signal transmitted to the yoke 110 from the lower link 28 associated with the compressed spring. When the operating conditions are such that the effect of the overhung weight of the implement exceeds the effect of the draft force, both of the levers 111 are in contact with the stops 118 and no signal is transmitted to the slide valve 35 by the cable 44, 46, so that there is no automatic control of the working depth.

When the mechanism is arranged as shown in any of

FIGS. 1, 2 and 3, it can also operate as a weight transfer system, without any automatic draft or positional control. An implement (not shown) having its own depth-regulating means such as a wheel or skid must be employed, and the datum lever 54 is moved by the driver into the ghosted position 83. When the hand lever 49 is aligned with the datum lever 54, the slide valve 35 is fully open, and even though the cable 44, 46 is operatively connected to the link 30, the arm 100 or the yoke 110, the automatic variations in movement of the slide valve caused by variations in the draft force exerted on the implement or by variations in the angular position of the shaft 26 are insufficient to cause the slide valve to throttle the flow of oil from the pump 10 to the valve 36. Thus the pressure in the hydraulic system is governed solely by the setting of the screwed adjusting member 40, so that a predetermined pressure can be maintained in the system whereby a predetermined constant amount of weight is transferred from the implement to the tractor without affecting the working depth of the implement, which continues to be controlled by its depth-regulating means. The hand lever 49 may also be moved to the ghosted positions 84 and 85, the result of so doing being exactly as when the mechanism is operated as a draft or positional control system. Thus when operating as a weight transfer system the hand lever 49 may normally occupy the ghosted position 85 so that the oil pressure is substantially zero, but when wheel-spin is encountered the hand lever is moved into the position 83 in alignment with the datum lever 54 whereupon an amount of weight depending upon the setting of the screwed adjusting member 40 is transferred from the implement to the tractor for as long as may be necessary, after which the hand lever 49 is returned to the position 85 and the pressure in the system reverts substantially to zero. The implement may be raised from its working position, and held in the raised position, by movement of the hand lever 49 to the position 84.

Figure 5:
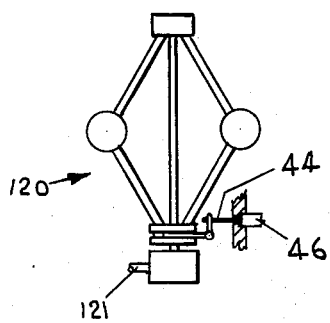
FIGURE 5 is a semi-diagrammatic view of a further alternative draft control arrangement.

Numerous modifications are possible without departing from the scope of the appendant claims. For example:

Draft control can be effected by connecting the wire 44 directly to one of the levers 111 as shown in FIG. 4, the casing 46 being caused to abut against the tractor frame at 115. Draft control can also be effected by connecting the cable 44, 46 to a governor 120 driven by a shaft 121 connected to the tractor engine (see FIGURE 5), whereupon any variation in engine speed caused by a variation in the draft force exerted by the tractor on the implement will result in an appropriate variation in the working depth of the implement thereby enabling the engine speed to return to the required value.

In addition to transmitting to the response member a signal comprising the mean of a plurality of signals, a signal comprising the sum or difference of a plurality of signals can also be transmitted to the response member.

Figure 7:
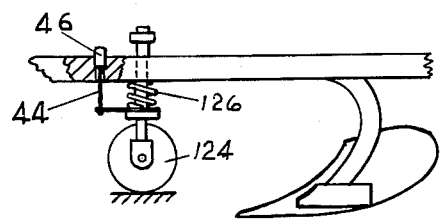
FIGURE 7 is a semi-diagrammatic view of another alternative positional control arrangement.

Positional control can be effected by connecting the wire 44 to part of an implement, for example a lifting boom 122 of a bulldozer (see FIGURE 6), actuated by an auxiliary hydraulic jack 123, the casing 46 abutting against the tractor frame at 125. This entails the establishment of communication through the valve chest 80 between the pump 10 and said auxiliary hydraulic jack 123, instead of between the pump 10 and cylinder 12. Positional control can also be effected (see FIGURE 7) by connecting the wire 44 to a ground-engaging signalling member movably mounted on the implement, said member comprising a wheel 124 urged by spring means 126 into contact with the ground. Thus any variation in the depth of penetration due to undulations in the surface of the ground is corrected by movement of the wire 44 actuating the slide valve 35, the outer casing 46 of which wire abuts against the frame of the implement.

In yet another modification, the valve 36 can be located upstream of the slide valve 35 but must remain downstream of the cylinder 12.

What I claim is:

1. A hydraulic power lift mechanism for a tractor having an implement hitched thereto comprising a hydraulic jack, means for operably connecting said jack to said implement for varying the position of said implement relative to the tractor and comprising a movably mounted motion transmitting member the position of which changes with changes in position of said implement and draft responsive linkage operably connecting said motion transmitting member to said implement, a manually controlled response member for controlling the fluid pressure in said jack, a flexible motion transmitting member connected for actuating the response member, a first signalling member in said linkage connectible to said flexible transmitting member and movable by variations in the draft force exerted by the tractor on said implement, and a second signalling member movable with said motion transmitting member connectible to said flexible transmitting member and movable in response to variations in the position of said implement relative to the tractor, said flexible motion transmitting member comprising a single flexible cable pivotally connected selectively to either the first signalling member or the second signalling member.

2. In the hydraulic power lift mechanism defined in claim 1, said motion transmitting member being a rock shaft actuated by said jack having a lift arm connected through said draft responsive mechanism to said implement, and means on said rock shaft comprising said second signalling member.

3. In the hydraulic power lift mechanism defined in claim 1, said first signalling member being an upper hitch link having means thereon for connection to the flexible motion transmitting member and movable by variations in the draft force exerted by the tractor on said implement.

4. In the hydraulic power lift mechanism defined in claim 1, said jack and said response member being connected in a hydraulic circuit, and said circuit containing also means for preventing the fluid pressure in said jack from falling below a predetermined value.

References Cited by the Examiner

UNITED STATES PATENTS

| | | | |
|---|---|---|---|
| 1,377,602 | 5/1921 | Rutherford | 172—3 |
| 2,527,840 | 10/1950 | Mott | 172—4 |
| 2,577,351 | 12/1951 | Mott | 172—465 X |
| 2,721,508 | 10/1955 | Edman | 172—9 |
| 2,799,251 | 7/1957 | Newgen | 172—465 X |
| 3,022,830 | 2/1962 | Hess | 172—7 |
| 3,120,278 | 2/1964 | Ashfield et al. | 172—9 |
| 3,125,168 | 3/1964 | Seguenot | 172—465 |

FOREIGN PATENTS

| | | |
|---|---|---|
| 1,238,877 | 7/1960 | France. |
| 1,111,444 | 7/1961 | Germany. |
| 871,053 | 6/1961 | Great Britain. |

ABRAHAM G. STONE, *Primary Examiner.*

FRANCIS B. HENRY, *Assistant Examiner.*